United States Patent [19]

Schneider

[11] 3,846,764

[45] Nov. 5, 1974

[54] TECHNIQUE FOR INFORMATION STORAGE USING ANISOTROPIC COLOR CENTERS IN ALKALI HALIDE CRYSTALS

[75] Inventor: Irwin Schneider, Alexandria, Va.

[73] Assignee: The United States of America as represented by the Secretary of the Navy, Washington, D.C.

[22] Filed: May 18, 1973

[21] Appl. No.: 361,700

[52] U.S. Cl... 340/173 LS, 340/173 CC, 350/160 P

[51] Int. Cl......................... G11c 11/42, G11c 13/04

[58] Field of Search................ 340/173 LS, 173 CC; 350/16 DP

[56] References Cited

UNITED STATES PATENTS

| | | | |
|---|---|---|---|
| 3,296,594 | 1/1967 | Van Heerden | 340/173 CC |
| 3,440,621 | 4/1969 | Knapp | 340/173 CC |
| 3,447,138 | 5/1969 | Carson | 340/173 CC |
| 3,466,616 | 9/1969 | Bron | 340/173 CC |
| 3,568,167 | 3/1971 | Carson | 340/173 CC |
| 3,609,707 | 9/1971 | Lewis | 340/173 CC |
| 3,771,150 | 11/1973 | Schneider | 340/173 CC |

*Primary Examiner*—Terrell W. Fears
*Attorney, Agent, or Firm*—R. S. Sciascia; Arthur L. Branning

[57] ABSTRACT

An information storage technique utilizing crystals containing anisotropic color centers in which the information is "written" and "read" non-destructively using only one coherent source of light.

11 Claims, 3 Drawing Figures

TECHNIQUE FOR INFORMATION STORAGE USING ANISOTROPIC COLOR CENTERS IN ALKALI HALIDE CRYSTALS

BACKGROUND OF THE INVENTION

This invention relates to an information storage technique in which information states are established in photochromic materials by electromagnetic radiation. More particularly, the invention concerns the orientation of dichroic defects, such as the anisotropic M or $M_A$ center consisting of two neighboring anion vacancies containing two trapped electrons within an alkali halide crystal such as potassium chloride. The technique would achieve a high density storage while requiring only one coherent source for both writing and as a non-destructive read.

Anisotropic color centers behave like atomic-sized dipoles absorbing light of certain wavelengths when the light happens to have a component of polarization parallel to the dipole axis of the center. In the crystal, the dipole axis for a particular center lies along one of several possible crystallographic directions depending upon the orientation of the center itself. These centers can be reoriented in a process which involves changing the direction of these dipoles from one or more cyrstallographic directions to only one predetermined direction. For example, the $M_A$ center, i.e., an intrinsic M center which lies next to an impurity ion such as $Na^+$, can randomly appear along one of six possible face diagonal lattice directions. With linearly polarized light, it is possible to align practically all the centers in a crystal along just one of these diagonals so that plane polarized light will be absorbed by the crystal only if the polarization vector of the light has a component along the color center axis.

Development of optical information storage systems with rapid write-read-erase capability requires a storage medium which exhibits negligible fatigue and thermal fade and which has a nondestructive readout. Unfortunately, most media have not met these requirements. For example, AgCl crystallities in glass show thermal fading, organic materials exhibit fatigue, and photochromic systems based on the interconversion of color centers in alkali halides show fatigue and/or destructive readout. The technique employing photodichroics such as alkali halides containing anisotropic color centers, etc. as described in U.S. Pat. No. 3,466,616, U.S. Pat. No. 3,580,688 and U.S. Pat. No. 3,720,926 overcome many of these difficulties, but require the use of two coherent light sources with different wavelengths to achieve a nondestructive read. For example, "writing" in the sodium doped potassium chloride crystal of U.S. Pat. No. 3,580,688 requires a coherent polarized source of light at relatively short wavelengths, $\lambda_w$ lying in the range from 450 to 580 nm. The information can be retrieved by illuminating the crystal with a second coherent polarized source $\lambda_r$ at relatively long wavelengths lying roughly between 780 and 840 nm. The information is retrieved either by detecting the amount of absorption of $\lambda_r$ light by the crystal or by detecting the emission induced by $\lambda_r$ at round 1080 nm in the near infrared spectral region. The disadvantage of any such system is the necessity of accurately steering two coherent independent, highly focussed laser beams. Furthermore, it would be difficult to use an element requiring two different wavelengths for "writing" and "reading" as a holographic store.

SUMMARY OF THE INVENTION

In accordance with the present invention, a novel information storage system is provided in which coherent light at only one wavelength controls writing and provides a nondestructive read. This is accomplished by subjecting all or part of the crystal to a beam of noncoherent light at a wavelength $\lambda_W$ while effectively storing information with a coherent beam of polarized light at $\lambda_r$. Writing can only occur where the two do not overlap so that information may be controlled with $\lambda_r$ light.

It is, therefore, an object of the present invention to provide a novel system in which information can be written into and read from the crystal nondestructively with coherent light of only one wavelength.

It is another object of the invention to provide an information storage system which utilizes the unique anisotropic properties of dichroic defects dispersed within an alkali halide crystal for affecting information storage and retrieval.

Yet another object of the invention is to provide a method by which only one coherent light source is required for producing a high density information storage and retrieval system.

Other objects, advantages and novel features of the invention will become apparent from the following detailed description of the invention when considered in conjunction with the accompanying drawings wherein:

DETAILED DESCRIPTION

The general purpose of this invention is to provide optical information material and apparatus with a high density storage capability. To attain this result, the present invention utilizes optical materials having anisotropic color centers able to be reoriented optically along unique crystallographic directions. Examples of such materials are alkali halides such as potassium chloride, potassium bromide, potassium iodide, sodium chloride, sodium fluoride or the like which are characterized by anisotropic color centers, such as the M and $M_A$ centers or the like, that are produced in these optical materials and oriented in a common direction with polarized radiation. Information is stored by realigning or reorienting the axis of the anisotropic centers along specific, predetermined directions.

The dichroic defects especially suitable for use with alkali halide crystals are known as M and $M_A$ centers. These may be produced in concentrations of $5 \times 10^{18}$ per $cm^3$ of crystal or less. The M and $M_A$ centers with the apparatus in which they are often used along with the proper techniques are disclosed in U.S. Pat. NO.

3,466,616 and U.S. Pat. No. 3,580,688, respectively, which are hereby incorporated by reference.

Figure 1:
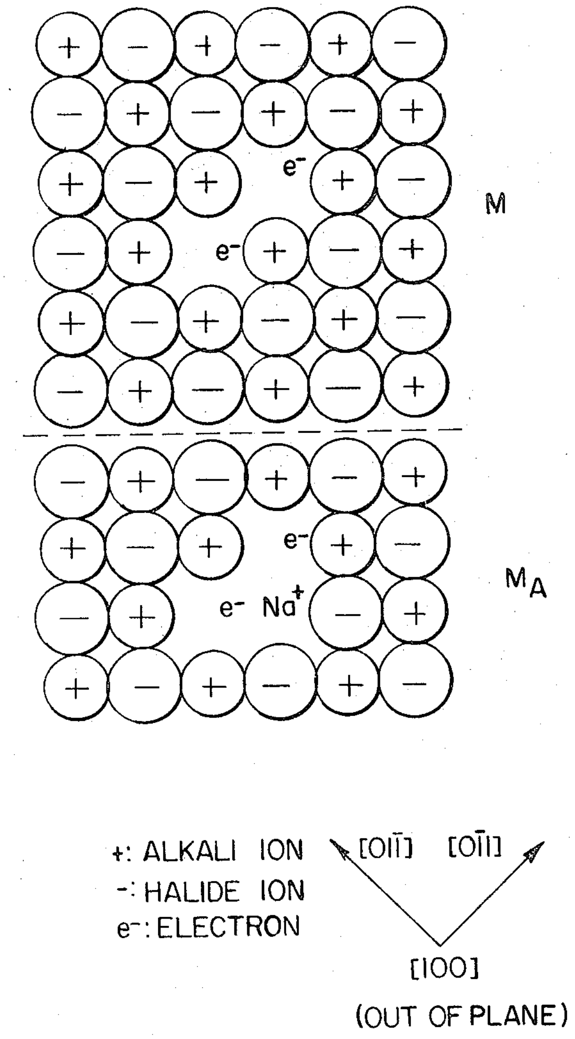
FIG. 1 is a schematic representation of an M and an $M_A$ center consisting, respectively, of two electrons trapped at a negative-ion vacancy pair, and an M center lying next to an $Na^+$ impurity ion.

FIG. 1 illustrates, schematically, an M center within an alkali halide crystal. An M center, consisting of a pair of nearest-neighbor F centers oriented along a [0$\bar{1}$1] crystallographic direction, gives two distinct, well-separated absorptions usually called the M and $M_F$ bands. Of importance is the fact that a distinct dipole moment is associated with each M-center absorption. In particular, for a center oriented along [0$\bar{1}$1] as shown in FIG. 1, the [0$\bar{1}$1] moment contributes to the M band and both the [100] and [01$\bar{1}$] moments contribute to the $M_F$ band. M centers can be reoriented with $M_F$ light so long as the electric vector of the incident light has a component parallel to the dipole moment of the $M_F$ absorption. As a result, one can realign practically all M centers along one direction with linearly polarized light and thereby make the M and $M_F$ absorption bands strongly dependent on the polarization of the incident light, i.e., the absorption bands are made dichroic. As shown in FIG. 1, the $M_A$ center is an M center adjacent to a substitutional alkali-ion impurity such as $Na^+$. Since the M and $M_A$ center have similar reorientational and optical properties, the above discussion likewise applies to the highly-stable $M_A$ centers.

With regard to the present technique, it has been shown that in order for M centers or $M_A$ centers to reorient, they must first absorb at $\lambda_w$ and ionize. The resulting $M^+$ and $M_A{}^+$ centers then absorb $\lambda_W$ and reorient. In crystals in which M and $M_A$ center electrons are trapped primarily as F′ or $F_A{}'$, (i.e. - the F′ center is an anion vacancy with two trapped electrons and an $F_A{}'$ center is an F′ center next to an alkali impurity) light absorbed by F′ and $F_A{}'$ centers can bleach F or $F_A{}'$ centers and consequently $M^+$ or $M_A{}^+$ centers before the $M^+$ or $M_A{}^+$ reorient. Thus, by simultaneously exposing the crystal to an auxiliary F′ or $F_A{}'$excitation as well as $\lambda_W$ one can suppress reorientation and use the F′ or $F_A{}'$ light instead of $\lambda_W$ to carry information. Furthermore, since the F′ and $F_A{}'$ bands overlap the M and $M_A$, $\lambda_r$ can be used in both operations.

$M_A$ centers are prepared by first growing an alkali halide crystal, such as potassium chloride with an impurity, such as sodium chloride, added to the melt. M centers alone would be produced in the pure crystals. Concentrations from 0.1 mole percent of 1 mole percent of sodium impurity are satisfactory with approximately 0.3 mole percent of sodium preferred. A seed consisting of a pure or sodium-doped KCl crystal is then inserted into the melt and the crystal seed pulled while maintaining the liquid salt and seed at temperature around the melting point of KCl. Color centers usually in the form of F centers are then introduced either through the use of ionizing irradiation such as ultraviolet light, x-rays, high energy electronds, etc. or by a process known as additive coloration. In the former method, the coloration thickness can be predetermined by selecting the proper ionizing energy, for example, a 0.006 cm thick coloration occurs using 100 kev electrons; a 0.001 cm coloration, on the other hand, is produced using 10 kev electrons. Crystals are additively colored by maintaining the crystal and a pellet of its alkali metal in a closed bomb between 475° and 675°K, concentration which is produced varies linearly with the alkali metal pressure. The latter usually increases with temperature.

M centers and some $M_A$ are next introduced near room temperature by exposing the crystal containing F centers to unpolarized light which is absorbed by F centers, for example, between 400 and 600 nm in potassium chloride. This exposure is carried out at room temperature until a maximum number of M centers form from the F centers. This point is determined by monitoring the M band at about 800 nm. In more heavily doped samples, the predominant aggragate produced could be and $M_A$ center with absorption at 820 nm. The final stage in producing $M_A$ centers for doped samples involves cooling the crystal to 77°K and exposing the crystal to light again. The M → $M_A$ center conversion is induced through successive random reorientations of the M center through the lattice until they become trapped and pinned by $Na^+$ ions.

Figure 2:
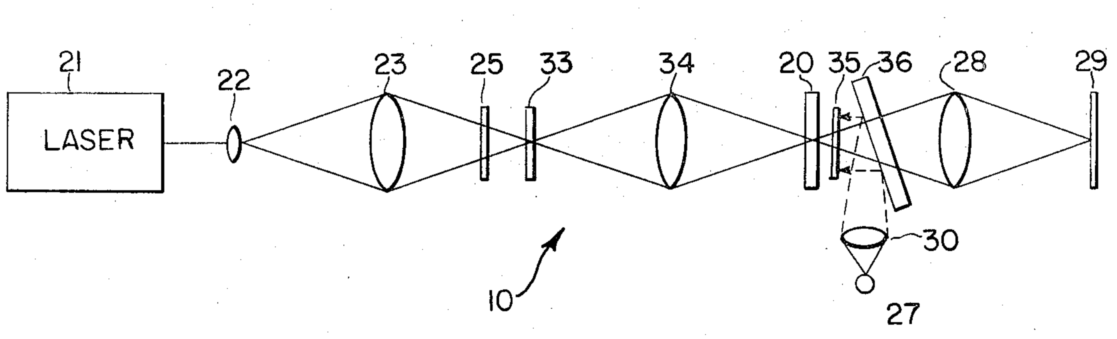
FIG. 2 is a diagrammatic view of one means for storing information using the optical material of this invention.

Now referring to FIG. 2 there is shown, in simplified diagrammatic view, one means for storing information by polarization of anisotropic color centers in the optical material of this invention. The memory system 10 consists of an optical storage material 20 having associated therewith illuminating means 21 for "writing" in and "reading" out information. The optical material 20 may be a single polished crystal, such as the aforementioned alkali halide crystal containing anisotropic M or $M_A$ centers. The optical material 20 may be mounted, in any suitable manner, i.e. on an optical dewar, not shown, for maintaining the material temperature below roughly 220°K.

The writing means includes a source of illumination 21. The radiation passes a lens expander 22 and is focussed by lens system 23 onto an information or diffusing element 25. The information contained therein is transferred to the optical material 20 by focussing lens 34. A polarizer 33 is placed between the focussing lens 34 and the information or diffusing element 25 so that radiation from source 21 is focussed on the memory 20 in polarized form, thus, irradiating color centers which have been previously aligned in a single direction. This initial alignment is established by subjecting the material memory 20 to noncoherent polarized light from illuminating means 27.

The illuminating means 21 employs radiation at the long wavelengths, i.e. about 780-840 nm for a KCl crystal. This radiation, $\lambda_r$ corresponds to the radiation used by the prior art solely to retrieve information. It falls within the peak of the M or $M_A$ absorption band.

Illuminating means, 27, directed to the rear side of the optical material 20 employs radiation at the short wavelengths, $\lambda_w$. This radiation falls within the peak of the $M_F$ band of the color center. For example, wavelengths between 450–580 nm are used for a KCl crystal.

After initially aligning the color centers with illuminating means 27, the polarity of radiation $\lambda_w$ is rotated by 90° and the optical material 20 is again subjected to this radiation. By subjecting the entire optical material 20 to light from source 27 having a wavelength in the short region, $\lambda_w$, all of the defects, i.e., M or $M_A$ centers, within the crystal undergo reorientation. Noncoherent light $\lambda_w$ from source 27 is thus projected onto the memory through lens 30 and mirror 36. The mirror is semi-transparent to allow light of certain wavelengths, i.e., $\lambda_r$, to pass through it. A polarizer 35 is placed between the mirror and the memory 20 to polarize the $\lambda_w$ radiation. If specific points within the crystal, corresponding to those in the diffusing element, are subjected to coherent polarized radiation $\lambda_r$ from source 21, simultaneously to being subjected to the noncoherent radiation $\lambda_w$ from source 27, any reorientation of these points due to the $\lambda_w$ radiation is suppressed. In other words, all defects within the crystal are subjected to a beam of radiation $\lambda_w$ and therefore undergo reorientation. Information from diffusing element 25 is "written" into the crystal by suppressing the reorientation at certain points by subjecting these points to a beam of radiation $\lambda_r$.

The information thus "written" into the crystal is retrieved by subjecting the crystal to radiation $\lambda_r$ from source 21. Those points that were not reoriented in the crystal will transmit more $\lambda_r$ light or induce less 1080 nm emission when subjected to $\lambda_r$ light. In this manner the points which were not reoriented are detected. If this emission at 1080 nm is to be detected, it is passed through a properly oriented infrared polarizer 35 to allow only the original polarized information, now in the form of emission, to be recorded on the infrared sensitive film 29. Emission from the excited crystal is thus focussed by the lens system 28 onto the sensitive film 29.

Figure 3:
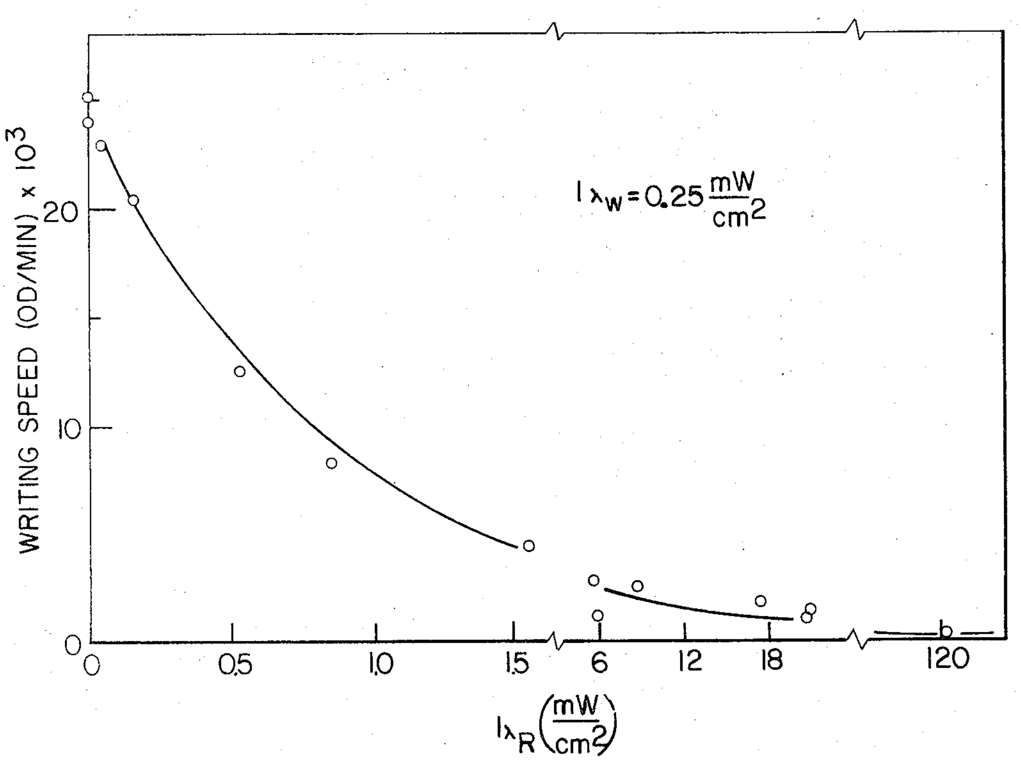
FIG. 3 is a graph showing the relationship between the writing speed and the intensity of the coherent light, $\lambda_r$.

FIG. 3 graphically illustrates the effectiveness of the $M_A$- center reorientation for an $I\lambda_w \approx 0.25$ m $^{W/}$cm$^2$ and a range of suppress intensities. This figure shows that the writing speed decreases well over two orders of magnitude with increasing $I\lambda_r$. Thus, any point in the crystal which is subjected to intense radiation $\lambda_r$ will not effectively undergo reorientation.

Memories employing anisotropic color centers are simple to fabricate, require no memory connections or memory circuits as to magnetic cores, are less costly to prepare, have lower requirements for electrical power, have reduced weight and size. The memory may be used to store, in addition to binary information, such information as maps, blueprints and other visual displays. by using the technique of the invention only one source of illumination need be coherent, thus, eliminating the need of costly steering mechanisms.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An information storage and display system comprising:

an optical material having anisotropic centers capable of being aligned in a common direction;

first illuminating means consisting essentially of incoherent polarized radiation operatively associated with said material, said illuminating means being capable of aligning said color centers at one polarity as well as reorienting said color centers at a second polarity;

second illuminating means including coherent polarized radiation operatively associated with said material, said second illuminating means being capable of suppressing the color center reorientation caused by said first illuminating means whereby information is written into said material; and detection means including said second illuminating means to determine the information state of the material.

2. The system of claim 1 wherein said optical material is an alkali halide crystal.

3. The system of claim 2 wherein said alkali halide crystal is KCl.

4. The system of claim 1 wherein said anisotropic color centers are M centers, said non-coherent polarized radiation has a wavelength within the peak of the $M_f$ absorption band of said M center, and said coherent polarized radiation has a wavelength within the peak of the M absorption band.

5. The system of claim 1 wherein said anisotropic color centers are $M_A$ centers, said incoherent polarized radiation has a wavelength within the peak of the $M_f$ absorption band, and said coherent polarized radiation has a wavelength within the peak of the $M_A$ absorption band.

6. The system of claim 3 wherein said incoherent polarized radiation has a wavelength between about 450–580 nm, and said coherent polarized radiation has a wavelength about 780–840 nm.

7. A method of storing and retrieving information comprising:

providing an optical material having anisotropic color centers;

aligning all of said color centers in a common direction with incoherent polarized radiation;

rotating the polarity of said incoherent polarized radiation by 90° and illuminating said material whereby said color centers reorient;

simultaneously illuminating portions of said material with coherent polarized radiation whereby the reorientation of the color centers in said portions of said material is suppressed; and determining the orientation of said color centers by irradiating said portions of said crystal with said coherent polarized radiation and measuring the emission therefrom.

8. A method according to claim 7, wherein, said optical material is an alkali halide crystal.

9. A method according to claim 8, wherein, said incoherent polarized radiation has a wavelength of about 450–580 nm, said coherent polarized radiation has a wavelength of about 780–840 nm, and said alkali halide crystal is a KCl crystal.

10. A method according to claim 7 wherein said anisotropic color centers are M centers, said incoherent polarized radiation has a wavelength within the peak of the $M_f$ absorption band of said M center, and said coherent polarized radiation has a wavelength within the peak of the M absorption band.

11. A method according to claim 7 wherein said anisotropic color centers are $M_A$ centers, said incoherent polarized radiation has a wavelength within the peak of the $M_f$ absorption band, and said coherent polarized radiation has a wavelength within the peak of the $M_A$ absorption band.

* * * * *